(No Model.)
J. GARLAND & J. KENYON.
LUBRICATING JOURNAL BEARING.
No. 274,755. Patented Mar. 27, 1883.
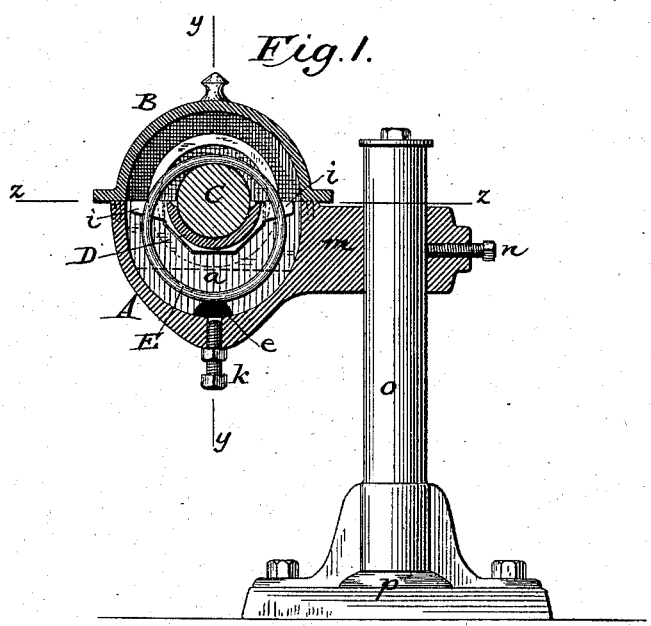
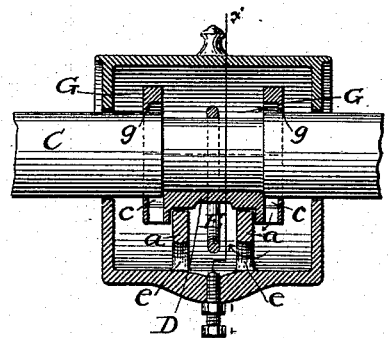
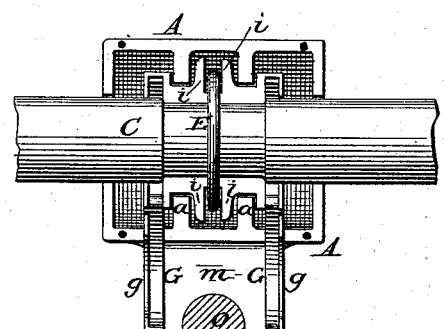
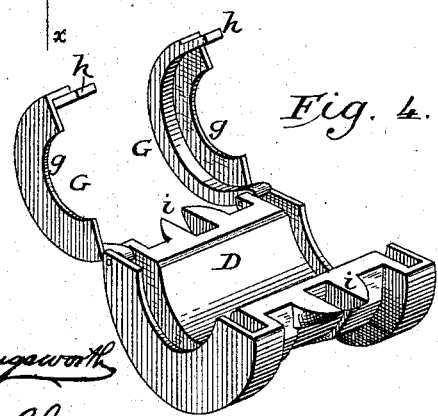
Attest.
Sidney P. Hollingsworth
Harry Shipley
Inventors.
James Garland
James Kenyon
by their Atty
P. T. Dodge.

UNITED STATES PATENT OFFICE.

JAMES GARLAND AND JAMES KENYON, OF LYNCHBURG, VIRGINIA.

LUBRICATING JOURNAL-BEARINGS.

SPECIFICATION forming part of Letters Patent No. 274,755, dated March 27, 1883.

Application filed January 22, 1883. (No model.)

*To all whom it may concern:*

Be it known that we, JAMES GARLAND and JAMES KENYON, of Lynchburg, in the county of Campbell and State of Virginia, have invented certain Improvements in Lubricating Journal-Bearings, of which the following is a specification.

The aim of this invention is to provide an automatic means to effect the constant and thorough lubrication of shaft and axle bearings and the journals running therein, and to prevent the oil or other lubricant from escaping from the box.

It consists in a peculiar construction of the bush or bearing of the box wherein it is mounted, and of guards to prevent the escape of the oil.

It also consists in the combination, with the box, of a reversible support adapted to be used at will as a hanger or as a pillar-support upon a floor or other surface below, all as hereinafter described in detail.

The invention also consists in minor features and combinations, hereinafter specified.

Referring to the accompanying drawings, Figure 1 represents a vertical cross-section through the center of our improved bearing. Fig. 2 is a longitudinal vertical section through the center of the same. Fig. 3 is a horizontal section on the line $z\,z$. Fig. 4 is a perspective view of the bearing proper and the guards or deflectors for retaining the oil.

In proceeding to construct our device we first provide an external box or reservoir consisting of the lower section, A, and the upper section, B, which may be made in a semicircular or other suitable form. The lower section, A, is made to serve as a cup or reservoir to retain the oil or other lubricating material, and is provided with semicircular notches or grooves in its ends to admit of the shaft or journal C being placed therein. In its interior the box is provided with two transverse ribs, $a$, designed to receive and support the lining or bearing D, which gives direct support to the shaft or journal. It will be observed that the bearing D has flattened faces on its outer surface, and is seated in correspondingly-shaped recesses in the ribs $a$, whereby the bearing is held rigidly in place and prevented from rotating within the box. On reference to Figs. 2, 3, and 4 it will be seen that the ends of the bearing D are provided with internal grooves or channels, $c$, encircling the surface of the journal for the purpose of receiving the oil which flows from the bearing, and causing the same to flow backward into the bottom of the box. The oil escapes from the channels $c$ through holes in the bottom of the bearing D, and flows thence through openings $e$ into the central portion of the box. It is preferred to construct the shaft, as shown, with a slightly-reduced neck or journal to rest within the bearing D, and to have the neck terminate over or adjacent to the grooves $c$ for the purpose of insuring the passage of the oil into said grooves.

For the purpose of delivering the oil to the shaft we employ a loose ring, E, of sufficient diameter to encircle the shaft and the bearing D, and arranged to hang freely upon the shaft, as shown. The box being provided with a supply of oil, the lower edge of the ring hangs therein, as shown in Fig. 1, and consequently when the shaft is set in motion it imparts a rotary motion to the ring, causing its surface to carry a constant supply of oil from the bottom of the box to the upper surface of the shaft, upon which it is distributed. This oil flowing downward upon the journal of the shaft becomes evenly distributed upon its surface and upon the surface of the bearing D, and finally returns, as before mentioned, through the grooves or channels $c$ to the bottom of the box. In this manner, it will be perceived, a constant circulation of oil over and between the wearing-surfaces is maintained.

In order to prevent the oil from passing endwise upon the shaft and escaping beyond the sides of the box, we hinge to the ends of the bearing D two semicircular guard-plates, G, arranged to close downward over and around the upper side of the shaft. These guards bear at their inner edges upon the shaft, and have at their outer edges lateral flanges or lips $g$, which assist in checking the outward flow of the oil. The upper ends of these guards (shown at $h$) are arranged to enter recesses in the bearing D, in order that the oil thereon may be directed downward into the bearing.

For the purpose of retaining the feeding-ring E in a central position we prefer to provide the bearing with projecting fingers $i$ on its outer edges to keep the ring in position between them, as shown. These fingers are not, however, a necessary feature of the device.

In order to admit of the impure oil being removed conveniently, we provide the box, in its under side, with a hole closed by a central screw, $k$, and to give the bottom of the box an inclination downward toward said hole, so that upon removing the screw the oil will flow outward.

The box, constructed as above, may be sustained in any suitable manner; but in order to adapt the same to be applied to supports above or below the shaft, as occasion may require, we prefer to provide the box on one side with an arm or projection, $m$, and to secure the latter by a set-screw, $n$, upon a supporting-arm, $o$, provided with or attached to a base-plate, $p$. The arm $o$ is passed through the projection on the journal-box, and may be removed and turned end for end therein. This construction admits of the arm being applied to an overhead support and used in the same manner as an ordinary hanger, or of its being bolted to a floor, frame, or other support below the shaft. The arm $o$ being made of round form, as shown, admits of the box swinging horizontally, as may be required to place the bearing in exact alignment with the shaft, thus facilitating the adjustment of the bearing.

The present invention is restricted to those matters and things which are hereinafter claimed, and as to all matters which may be described or shown, but which are not claimed, the right is reserved to make the same the subject of a separate patent.

Having thus described our invention, what we claim is—

1. In combination with the external box or reservoir having internal ribs, $a$, the bearing D, seated upon and interlocking with said ribs, the shaft C, and the ring E.

2. In combination with the external box or reservoir, the internal bearing, the shaft, and the feeding-ring suspended upon the shaft, the guards G, extending over the shaft outside of the bearing, substantially as described.

3. In combination with the shaft and the oil-feeding ring E, the bearing D, provided with lugs $i$ to retain said ring in position.

4. In combination with the shaft, the bearing D, provided with the channels $c$ at its ends, the external box or reservoir, $a$, and the central ring, E, suspended upon the shaft, substantially as shown.

5. In combination with the shaft, the reservoir, and the bearing, the guards G, having the inwardly-projecting flanges or lips, substantially as shown.

6. In combination with the shaft-bearing having the lateral arm $m$, the reversible sustaining-arm $o$, provided with the plate $p$ and set-screw $n$.

7. In combination with the shaft-bearing having the reduced neck or journal, the bearing D, having the grooves $c$ located immediately under or adjacent to the ends of said neck, whereby the flow of the escaping oil into said grooves is insured.

8. In combination with the shaft and its bearing D, having grooves $c$, the guards G, hinged at one end to said bearing, and having their opposite ends provided with projecting tongues H, arranged to enter the same, as shown.

JAMES GARLAND.
JAMES KENYON.

Witnesses:
CHARLES BLACKFORD,
DANL. ELMER.